US010870092B2

(12) United States Patent
Cavaglia'

(10) Patent No.: US 10,870,092 B2
(45) Date of Patent: Dec. 22, 2020

(54) APPARATUS INCLUDING ROTOR AND STATOR HAVING TEETH WITH SURFACES OF A PARABOLIC PROFILE AND METHOD FOR ENHANCING PHASE CONTACT AND CHEMICAL REACTIONS

(71) Applicant: BOB SERVICE Srl, Turin (IT)

(72) Inventor: Giuliano Cavaglia', Pessione Fraz. di Chieri (IT)

(73) Assignee: BOB SERVICE SRL, Turin (IT)

( * ) Notice: Subject to any disclaimer, the term of this patent is extended or adjusted under 35 U.S.C. 154(b) by 0 days.

(21) Appl. No.: 16/483,555

(22) PCT Filed: Feb. 12, 2018

(86) PCT No.: PCT/IB2018/050850
§ 371 (c)(1),
(2) Date: Aug. 5, 2019

(87) PCT Pub. No.: WO2018/146647
PCT Pub. Date: Aug. 16, 2018

(65) Prior Publication Data
US 2020/0139316 A1    May 7, 2020

(30) Foreign Application Priority Data

Feb. 10, 2017   (IT) .................. 102017000015144

(51) Int. Cl.
*B01F 7/00*    (2006.01)
*A23C 3/00*    (2006.01)
(Continued)

(52) U.S. Cl.
CPC ............ *B01F 7/00816* (2013.01); *A23C 3/00* (2013.01); *A23L 3/0155* (2013.01);
(Continued)

(58) Field of Classification Search
CPC .... B01F 7/0075; B01F 7/008; B01F 7/00808; B01F 7/00816; B01F 7/00833;
(Continued)

(56) References Cited

U.S. PATENT DOCUMENTS 5,692,829 A * 12/1997 Chiappa .................. A23G 1/10
366/303
7,887,862 B2 * 2/2011 Paz Briz .................. C13K 1/06
426/18
(Continued)

FOREIGN PATENT DOCUMENTS

WO    2016/001476 A    1/2016
WO    2018/146647    *  8/2018

*Primary Examiner* — Charles Cooley
(74) *Attorney, Agent, or Firm* — Howson & Howson LLP

(57) ABSTRACT

An apparatus for enhancing phase contact and chemical reactions is provided. The apparatus comprises at least one high-turbulence mixing stage and at least one high-shear-stress and high-cavitation stage. The stages are adapted to cause an increase in relative sliding speeds of phases involved in a multiphase flow passing through the stages. The high-shear-stress and high-cavitation stage comprises a rotor having radial teeth housed in a cavitation chamber surrounded by a stator having radial teeth. The facing surfaces of the radial teeth have a parabolic profile in circumferential direction. For each tooth, the parabolic profile lies along a curve of a parabola of which a vertex is arranged at a rear edge of the tooth, with respect to a direction of rotation of the rotor, and along a radius extending from the rear edge to a center of the rotor. The focus of the parabola is also located on the radius.

19 Claims, 10 Drawing Sheets

(51) Int. Cl.
*A23L 3/015* (2006.01)
*B01D 11/02* (2006.01)
*B01J 19/00* (2006.01)
*B01J 19/18* (2006.01)
*B01D 11/00* (2006.01)

(52) U.S. Cl.
CPC ...... *B01D 11/0226* (2013.01); *B01D 11/0257* (2013.01); *B01F 7/00633* (2013.01); *B01J 19/008* (2013.01); *B01J 19/0066* (2013.01); *B01J 19/1806* (2013.01); *A23V 2002/00* (2013.01); *B01D 2011/002* (2013.01); *B01F 2215/0036* (2013.01); *B01F 2215/0427* (2013.01); *B01F 2215/0431* (2013.01); *B01F 2215/0459* (2013.01); *B01F 2215/0481* (2013.01)

(58) Field of Classification Search
CPC .......... B01F 7/00358; B01F 2215/0431; B01F 7/00775; B01F 7/00791; B01F 7/00758; B01F 7/00766; B01F 7/0085; B01F 7/00858; B01F 7/00866; B01F 7/00875; B01F 7/00633; B01F 2215/0036; B01F 2215/0427; B01F 2215/0459; B01F 2215/0481; C02F 1/34; C02F 2201/003; A23C 3/00; A23L 3/0155; B01D 11/0226; B01D 11/0257; B01D 2011/002; B01J 19/0066; B01J 19/008; B01J 19/1806; B01J 2219/00765; B01J 2219/00779; B01J 8/0045; B01J 8/10; B01J 19/1818; A23V 2002/00

USPC ........................ 366/286, 302, 304, 305, 306
See application file for complete search history.

(56) References Cited

U.S. PATENT DOCUMENTS

| | | | |
|---|---|---|---|
| 10,202,288 B2 * | 2/2019 | Sirok | ........................ C02F 1/34 |
| 2007/0097784 A1 | 5/2007 | Arletti et al. | |
| 2011/0151524 A1 | 6/2011 | Gordon et al. | |
| 2013/0345472 A1 | 12/2013 | Hassan et al. | |
| 2014/0363855 A1 | 12/2014 | Gordon et al. | |
| 2016/0167983 A1 * | 6/2016 | Sirok | .................. B01F 7/00758 422/127 |
| 2018/0141837 A1 * | 5/2018 | Kim | .................... B01F 3/04531 |
| 2020/0046014 A1 * | 2/2020 | Clavier | ............ B01F 15/00935 |
| 2020/0139316 A1 * | 5/2020 | Cavaglia' | ........... B01F 7/00633 |

* cited by examiner

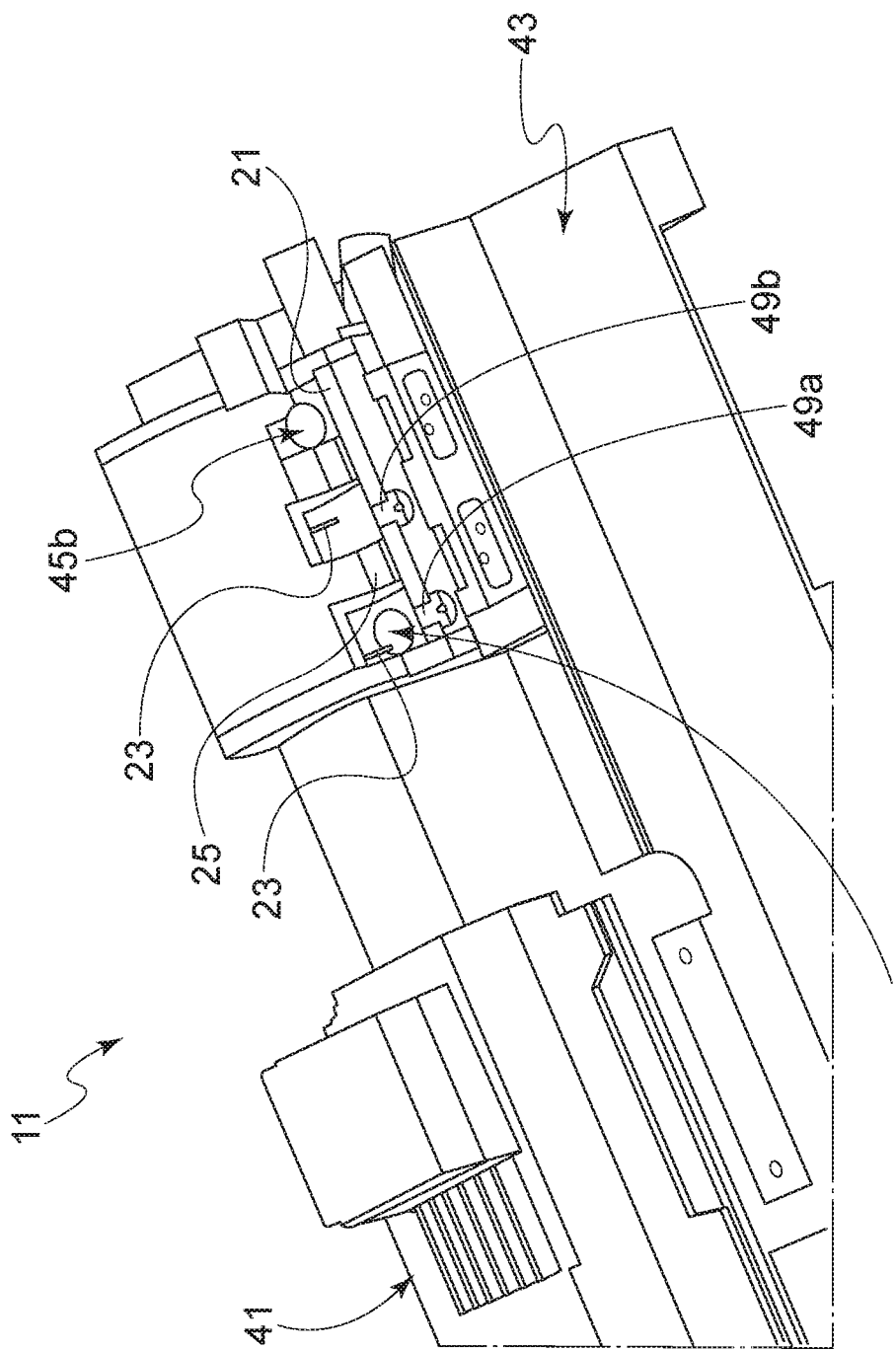

APPARATUS INCLUDING ROTOR AND STATOR HAVING TEETH WITH SURFACES OF A PARABOLIC PROFILE AND METHOD FOR ENHANCING PHASE CONTACT AND CHEMICAL REACTIONS

TECHNICAL FIELD

The invention relates to an apparatus and a method for enhancing phase contact and chemical reactions. More precisely, the invention concerns an apparatus and a method for enhancing phase contact, and hence matter and heat transport, and for enhancing chemical reaction kinetics. Different kinds of phases can be concerned by the apparatus and the method according to the invention, in particular solid-liquid, gas-liquid, gas-liquid-solid and liquid-liquid phases.

PRIOR ART

In operations involving phase contact, the processes of transfer of properties, e.g. matter and heat, are mainly governed by equations of the kind:

$$Fp = A \times K \times \Delta C,$$

where:
Fp=flow of properties (e.g. matter, heat);
A=interphase area;
K=property exchange coefficient;
ΔC=thrust force.

The above relation clearly shows that, in order to enhance property transfer, for a given thrust force ΔC, A, i.e. the interphase area, and K, i.e. the property exchange coefficient, have to be maximised. Known phenomena allowing increasing the interphase area and the property exchange coefficient are mainly turbulence, shear stress and cavitation. Such phenomena actually cause a considerable increase in the relative sliding speeds of the different phases involved.

At present, the most efficient apparatus for enhancing gas-liquid phase contact is the ejector gas-liquid contactor. By using such an apparatus for putting a gaseous flow of $O_3$ (ozone) in contact with water, volumetric matter transfer coefficients (kLa) in the range from 0.025 to 0.062 $s^{-1}$ are obtained.

It is also known that in multiphase systems, chemical reactions take place the most effectively the most effective the mixing of the reacting phases is and the greater the interphase area is. Moreover, it is to be taken into account that the reaction rate of chemical reactions is mainly ruled by the Arrhenius equation:

$$K = k_o \, \mathrm{Exp}[-E_a/RT],$$

where
K=Reaction rate;
$k_o$=Pre-exponential factor (experimentally determined);
$E_a$=Activation energy (experimentally determined);
R=Universal gas constant;
T=Absolute temperature.

In turn, the Arrhenius equation is based on the Maxwell-Boltzmann equation, describing the distribution F(E) of molecular energies E in equilibrium systems:

$$F(E) = 2(E/\pi)^{1/2}(1/kT)^{3/2} \, \mathrm{Exp}[-E/kT],$$

where k is the Boltzmann constant.

The Boltzmann equation clearly shows that, at a given temperature, independently of how low it is, molecules exist whose molecular energy exceeds the activation energy, i.e. $E > E_a$, whereby, in case of a collision, chemical reaction occurs. Since the Arrhenius equation is obtained by integrating the Maxwell-Boltzmann equation, reaction rate K exponentially depends on activation energy $E_a$ and on temperature T.

Therefore, the following considerations ensue from what stated above:
- the Maxwell-Boltzmann equation entails that, for each reaction, a number of molecules reacting even at low temperature exists, even if that number is negligible; and
- the exponential nature of the Arrhenius equation entails that the reaction rate is doubled (tripled, quadrupled . . . ) at each increase by 10° C.

From such considerations, the fact ensues that, in the conventional practice, the method of attaining acceptable chemical reaction rates consists in increasing T until a level corresponding to activation energy $E_a$ of the desired chemical reaction is exceeded. For that reason, most apparatuses in which chemical reactions are at present conducted are based on temperature increase and random collision among molecules, which in turn are in an agitation state determined by random displacements in space.

Examples of apparatuses capable of enhancing phase contact and chemical reactions are disclosed in WO 2005 039745 A1, WO 2013 191713 A1, WO 2016 001476 A1, US 2011 0151524 A1 and US 2014 0363855 A1.

Yet, the results attainable with the conventional systems are unsatisfactory for many applications, and thus the need for apparatuses and methods attaining better results and higher performance is strongly felt.

Thus, it is a first object of the present invention to provide an apparatus and a method for enhancing phase contact and enhancing chemical reactions, which overcome the drawbacks and the limits of the prior art and allow attaining higher performance.

It is another object of the invention to provide an apparatus and a method of the above kind, which are suitable for a multiplicity of applications and allow meeting the increasing demand in many industrial fields and applications.

It is a further but not the latter object of the invention to provide an apparatus and a method for enhancing phase contact and enhancing chemical reactions, which can be industrially manufactured and implemented at limited costs.

The above and other objects are achieved by the apparatus and the method as claimed in the appended claims, which are integral part of the technical teaching provided in the present description in respect of the invention.

DESCRIPTION OF THE INVENTION

The apparatus for enhancing phase contact and chemical reactions according to the invention mainly comprises at least one first high-turbulence mixing stage and at least one second high-shear-stress and high-cavitation stage. Said stages are advantageously adapted to cause an increase in the relative sliding speeds of the phases involved in a multiphase flow passing through said stages. According to the invention, the multiphase flow can be formed in equicurrent or countercurrent mode.

Advantageously, according to the invention, each high-turbulence mixing stage and each high-shear-stress and high-cavitation stage include a rotor and a corresponding stator surrounding the rotor. Preferably, the rotors of the mixing stages include a rotating shaft located at the centre of the chamber defined by the corresponding stator, and at least one radial member, e.g. a radial pin or peg, arranged to cause turbulent motion in the substance present in the chamber defined by the stator and surrounding the rotor. Preferably, moreover, the high-shear-stress and high-cavitation stages have rotors provided with toothed peripheral surfaces and corresponding stators also provided with toothed peripheral surfaces facing the teeth of the respective rotors.

Preferably, according to the invention, each rotor of the high-turbulence mixing stages and the high-shear-stress and high-cavitation stages is associated with a same rotor shaft centrally passing through all stages of the apparatus.

In a preferred embodiment of the invention, the first and the last stage of the plurality of stages belonging to the apparatus are provided with at least one corresponding port for the inlet and the outlet, respectively, of the substance being treated.

In accordance with a particular embodiment of the invention, in which the apparatus operates in countercurrent mode, the apparatus comprises a first high-turbulence mixing stage provided with a first port for the inlet of a first substance which is in a first physical state and a second port for the outlet of a second substance which is in a second physical state, and a second high-turbulence mixing stage provided with a first port for the inlet of a substance which is in said second physical state and a second port for the outlet of a substance which is in said first physical state.

In accordance with another particular embodiment of the invention, in which the apparatus operates in equicurrent mode, the apparatus comprises a first high-turbulence mixing stage provided with a first port for the inlet of a first substance which is in a first physical state and a second port for the inlet of a second substance which is in a second physical state, and a second high-turbulence mixing stage provided with a first port for the outlet of a substance which is in said second physical state and a second port for the outlet of a substance which is in said first physical state.

Still according to the invention, said first and second physical states are preferably different from each other, and may include the liquid state, the solid state and the gaseous state.

Preferably, said two high-turbulence mixing stages provided with said ports are located at opposite ends of the succession of alternate high-turbulence mixing stages and high-shear-stress and high-cavitation stages.

Preferably, moreover, said two high-turbulence mixing stages provided with said ports are the first and the last stage passed through by the substances treated by the apparatus. Preferably therefore, when the apparatus operates in countercurrent mode, said two high-turbulence mixing stages provided with said ports are the first and the last stage passed through by a first of said substances and the last and the first stage passed through by a second of said substances treated by the apparatus, respectively, whereas, when the apparatus operates in equicurrent mode, said two high-turbulence mixing stages provided with said ports are the first and the last stage passed through by both substances treated by the apparatus.

The method for enhancing phase contact and chemical reactions according to the invention preferably exploits the above apparatus and comprises subjecting a multiphase flow in equicurrent or countercurrent mode to at least one first high-turbulence mixing stage and to at least one second high-shear-stress and high-cavitation stage, thereby causing an increase in the relative sliding speeds of the phases involved in said multiphase flow passing through the stages.

A first advantage of the invention results from the combined action of the three phenomena governing the property transfer processes in a multiphase flow. Actually, the apparatus according to the invention provides for subjecting the multiphase flow to at least one first high-turbulence mixing stage and to at least one second high-shear-stress and controlled-cavitation stage.

Always thanks to the serial action of the stages of the apparatus on the multiphase flow, the multistage apparatus according to the invention is particularly effective in creating interphase area and enhancing phase mixing.

By way of example, by putting a gaseous flow of $O_3$ (ozone) in contact with water, volumetric matter transfer coefficients (kLa) ranging from about 0.45 to 0.95 $s^{-1}$ are obtained, and consequently 99% by mass of the ozone being fed is transferred to the liquid phase.

In accordance with a particular embodiment of the invention, in case the countercurrent phase contact is beneficial, as it occurs for instance in unitary stripping, extraction, leaching, etc. operations, the phases can be fed in countercurrent mode, thereby allowing forming a number of equilibrium stages far higher than the number of real stages.

For instance, in case of an apparatus made in accordance with the invention and comprising two turbulent mixing stages alternated with two high-shear-stress and controlled-high-cavitation stages, when feeding a solid vegetable matrix in one direction and an extracting liquid phase in countercurrent mode, an extraction performance is attained which is equivalent to the performance attainable with a series of more than 15 theoretical equilibrium stages.

According to the invention, the extracting liquid phase can also be fed through side nozzles passing through the stator walls at the high-turbulence mixing stages, if the operation of the apparatus according to the invention in crossflow regimen is beneficial.

Still according to the invention, also a gaseous phase can be fed through the side nozzles leading to the mixing chambers of the high-turbulence mixing stages, if that phase is beneficial for attaining the best results, as it occurs for instance in case of "gas assisted extraction", "gas assisted solid-liquid mixing", "gas assisted operation", "gas assisted cavitation", etc.

Always according to the invention, also a gaseous or liquid phase, intended to act as a reactant fed on-demand into the continuous current axially passing through the apparatus, can be fed through the side nozzles, in case of application as a gas-liquid reactor or as a gas-liquid-solid reactor.

Always according to the invention, also a gaseous or liquid phase for thermal conditioning purposes can be fed through the side nozzles, it this is of advantage for the unitary operation being conducted.

The apparatus according to the invention advantageously affords the possibility of conducting chemical reactions in a reaction volume characterised by:
  bubble clusters, with bubble sizes that can range from 0.05 to 5 microns, in continuous evolution (average bubble life ranging from 0.1 to 2.5 microseconds), where the bubble temperature, at the moment of the implosion, raises up to 1000-2000° K, without increasing the average temperature of the fluid inside the reaction volume, and the bubble pressure raises up to 1000-2000 bars, without increasing the average pressure inside the reaction volume;
  regions with a unidirectional flow at very high speed (narrow section resulting from the overlap of the parabolic stator teeth on the parabolic rotor teeth), determining collision speeds for the fluid contained in the controlled cavitation rotor-stator cavities, contiguous to the narrow sections, of the order of 100 to 750 m/s.

The invention provides for having stator and rotor teeth with parabolic profile, with the parabolic equation being as close as possible to the curvature taken by the stream lines while approaching the section narrowing.

Advantageously, the teeth with parabolic profile approximate as much as possible the curved profile taken by the stream lines of the fluid near the section narrowing, so as to minimise energy dissipations (i.e. pressure drops) associated with the "separation region" and the "vena contracta".

The dissipations associated with the formation of the "separation region" and with the "vena contracta" are dissipations which are scarcely beneficial to the target of surface generation and to the increase of the relative sliding speeds, and hence of the matter and heat transport coefficients. On the contrary they are dissipations having a negative impact as far as the (undesired) temperature increase of the fluid being treated, and hence the overall energy consumption of the operation, is concerned.

The parabolic profile must have horizontal tangent at the point of minimum gap in the stator tooth-rotor tooth overlap, so that the fluid flow enters the next settling chamber at very high speed in a single direction, orthogonal to the radial plane of the same settling chamber. In this manner, the jet force is prevented from spreading in a direction fan, to the advantage of the unidirectionality, which increments the probability of occurrence in the events depending on collisions of molecules, such as chemical reactions and transport of properties (i.e. matter and heat).

In practice, in each settling chamber following a stator tooth-rotor tooth coupling, cavitation phenomenon takes place because of the pressure decay due to the abrupt widening. Cavitation continuously generates clusters of bubbles living for some microseconds and then imploding generating high temperatures/high pressures (inside the individual bubbles) and very high speed jets. The continuously generated cavitation jets continuously collide with the incident jets arising from the high-shear regions where the stator/rotor teeth with parabolic profile overlap. Cavitation, shear stress and the collision of cavitation jets and of jets due to teeth coupling cause enhancement of phase contact and chemical reactions.

Advantageously, in this manner, the apparatus according to the invention allows obtaining chemical reactions at even low temperatures, such that no reaction would occur when using conventional systems. Moreover, always thanks to the apparatus according to the invention, it is possible to increase the reaction rate by one to two orders of magnitude, by operating at temperatures at which, with conventional systems, occurrence of the chemical reactions just starts being detected.

The main factors allowing achieving such a result are the temperature and pressure increase inside the individual bubbles in the clusters generated by cavitation in the cavitated regions inside the high-shear-stress and controlled-cavitation stages, and the high molecule collision speed due to the collision of the fluid strongly accelerated in the narrow sections between the stator/rotor teeth in the high-shear-stress and controlled-cavitation stage with the very high speed microjets resulting from the implosion of the cavitation bubbles. Moreover, the unidirectionality of the high speed flow regions is a further factor causing achievement of the above-mentioned results.

Reaction rate increase depends on the fact that the molecules undergoing the collisions at very high speed (typically in the range of about 100 to 750 m/s), resulting from the combined action of the microjets resulting from the implosion of the cavitation bubbles and of the unidirectional flow acceleration in the narrow high-shear stress sections between the stator and rotor teeth, have a global molecular energy, obtained by adding kinetic component E(v) and thermal component E(T), exceeding activation energy $E_a$.

That is, the following relation applies:

$$E(v)+E(T) \geq E_a$$

Imagining two colliding molecules with masses $M_1$ and $M_2$, respectively, it is determined that:

$$E(v)=M_1 v^2/2+M_2 v^2/2.$$

Assuming then that $M_1=M_2=M$ (what happens for instance in cracking and dissociation reactions), then:

$$Mv^2+E(T) \geq E_a,$$

and hence:

$$v=[(E_a-E(T))/M]^{1/2}.$$

By operating at low temperatures, E(T) becomes negligible and therefore:

$$v=[E_a/M]^{1/2}.$$

Considering for instance the ammonia dissociation reaction:

$$2NH_3 \leftrightarrow N_2+3H_2,$$

which is an endothermic reaction demanding 46.4 kj/mol and is characterised by an activation energy $E_a$=190 kj/mol, it can be seen that, in order the reaction takes place, it is sufficient to make the $NH_3$ molecules (M=17,031 kg/mol) collide at a speed:

$$V=[190,000/17.031]^{1/2} \approx 110 \text{ m/s}.$$

The combined action of high shear stress and cavitation, with resulting peaks of T and P inside the bubbles during the implosion phase, further makes the apparatus according to the invention very performant for operations of microbial disinfection on liquid phases and for operations of enzyme and protein recovery at the end of biological processes.

The cavitation number can be expressed as:

$$\sigma=(pr-pv)/(\tfrac{1}{2}\rho v^2),$$

where:
σ=cavitation number;
pr=reference pressure (Pa);
pv=vapour pressure of the fluid (Pa);
ρ=density of the fluid (kg/m³);
v=speed of the fluid (m/s).

Cavitation occurs when cavitation number σ is less than or equal to 1.

According to the invention, by operating at cavitation numbers in the range of about 0.2 to 0.3, enzyme and protein recoveries higher than 90% can be achieved.

By summarising, the application of an apparatus according to the invention to a multiphase system allows attaining the following main advantages:

(a) mass-transfer or heat-transfer with kinetics exceeding by two orders of magnitude the kinetics of the conventional systems, thanks to the greater interphase areas and the higher exchange coefficients;

(b) chemical reaction with kinetics higher by one-two orders of magnitude with respect to the conventional systems and at significantly lower temperatures with respect to the conventional systems, thanks to the greater interphase areas and to the fact that, according to the invention, the kinetic energy provides a significant contribution to the attainment of the reaction activation energy, by subtracting the role of absolute protagonist to the thermal component.

DESCRIPTION OF THE FIGURES

Some preferred embodiments of the invention will be given by way of non-limiting example with reference to the accompanying Figures, in which:

FIG. 2B is a cross-sectional view of the stages of the apparatus shown in FIG. 1, in which the nozzles are put in evidence;

In all Figures, the same reference numerals have been used to denote equal or functionally equivalent components.

DESCRIPTION OF SOME PREFERRED EMBODIMENTS OF THE INVENTION

Figure 1:
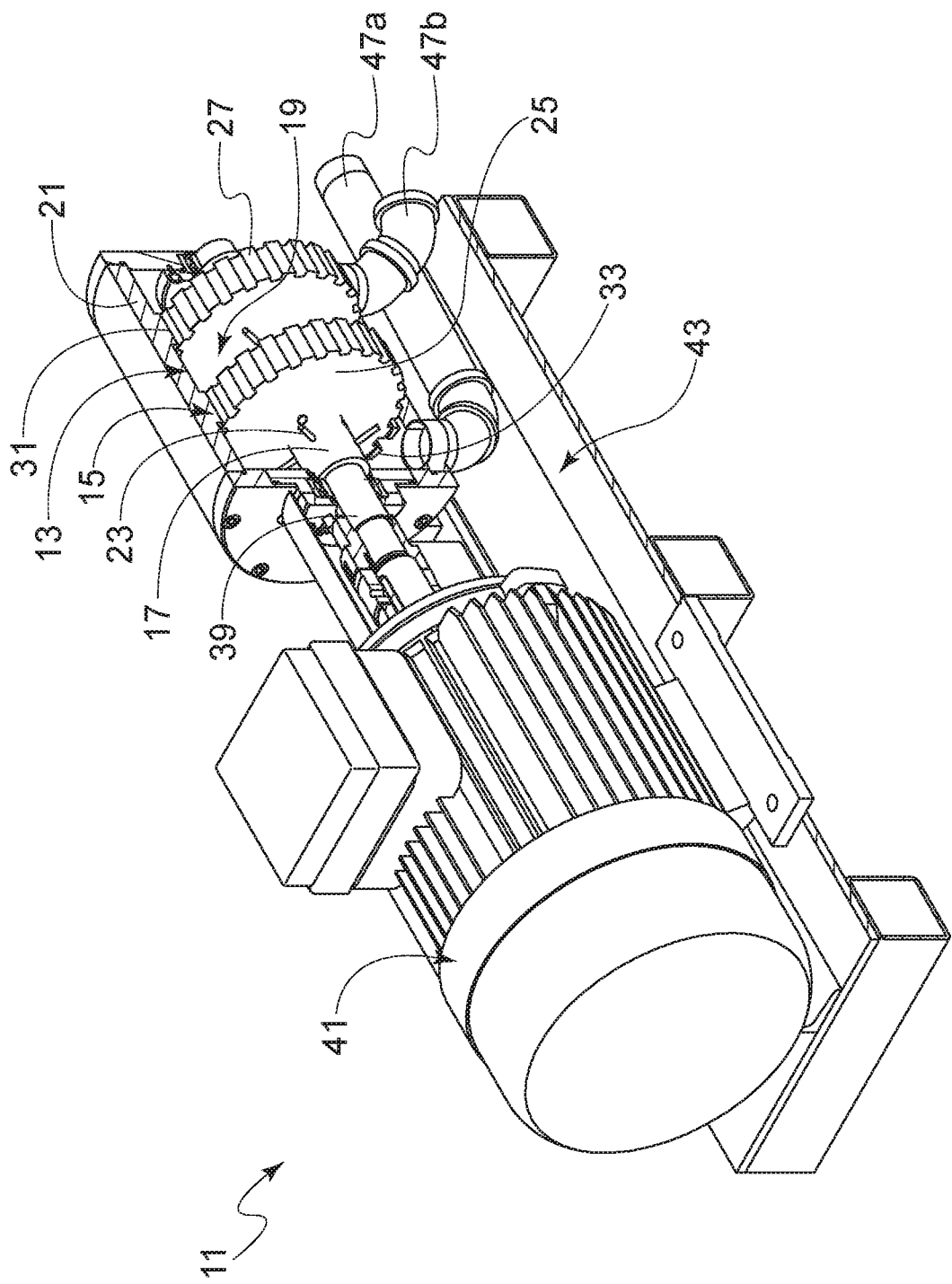
FIG. 1 is a part-sectional perspective view of a preferred embodiment of an apparatus according to the invention.
Figure 2A:
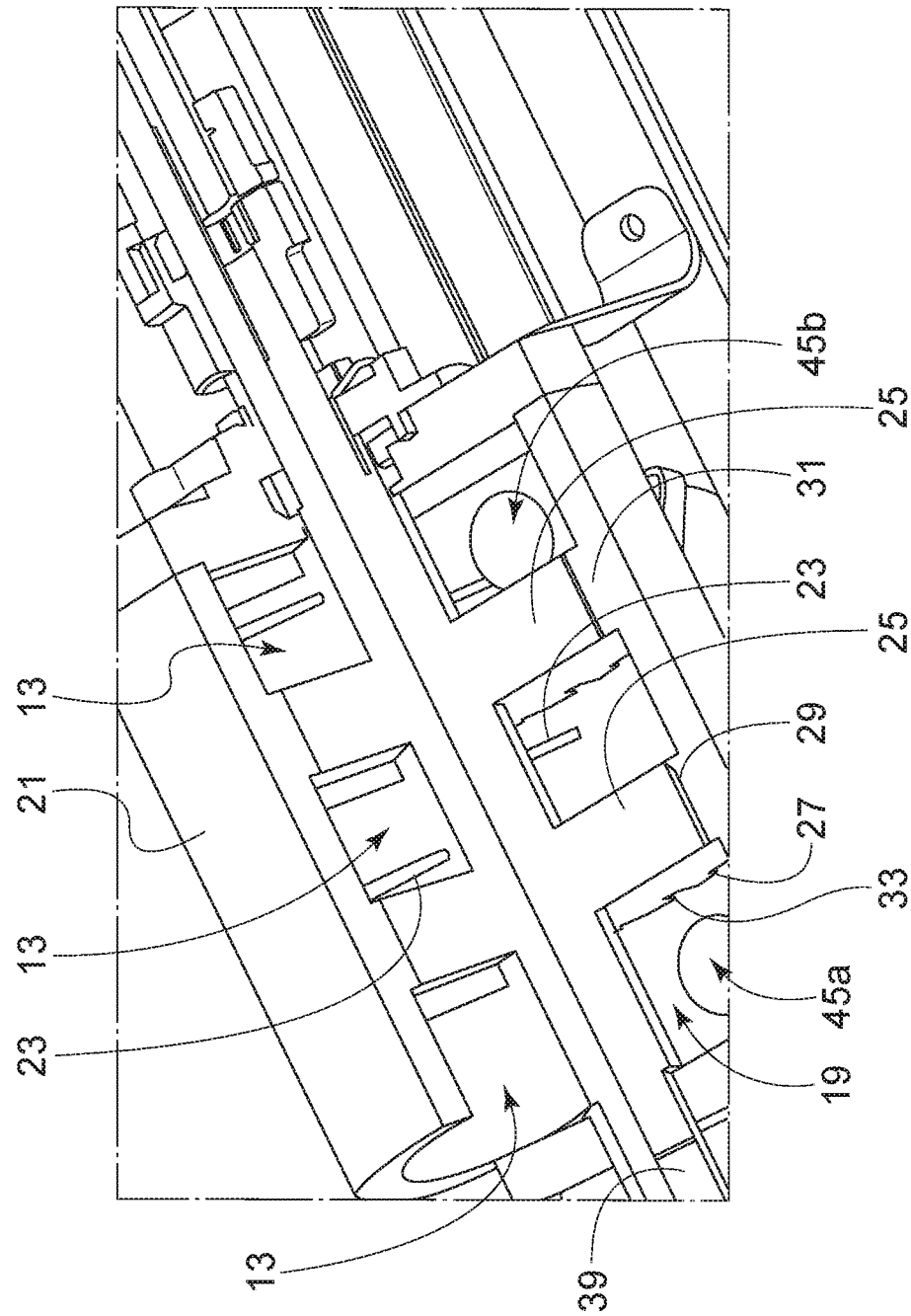
FIG. 2A is a sectional view of the stages of the apparatus shown in FIG. 1.
Figure 3A:
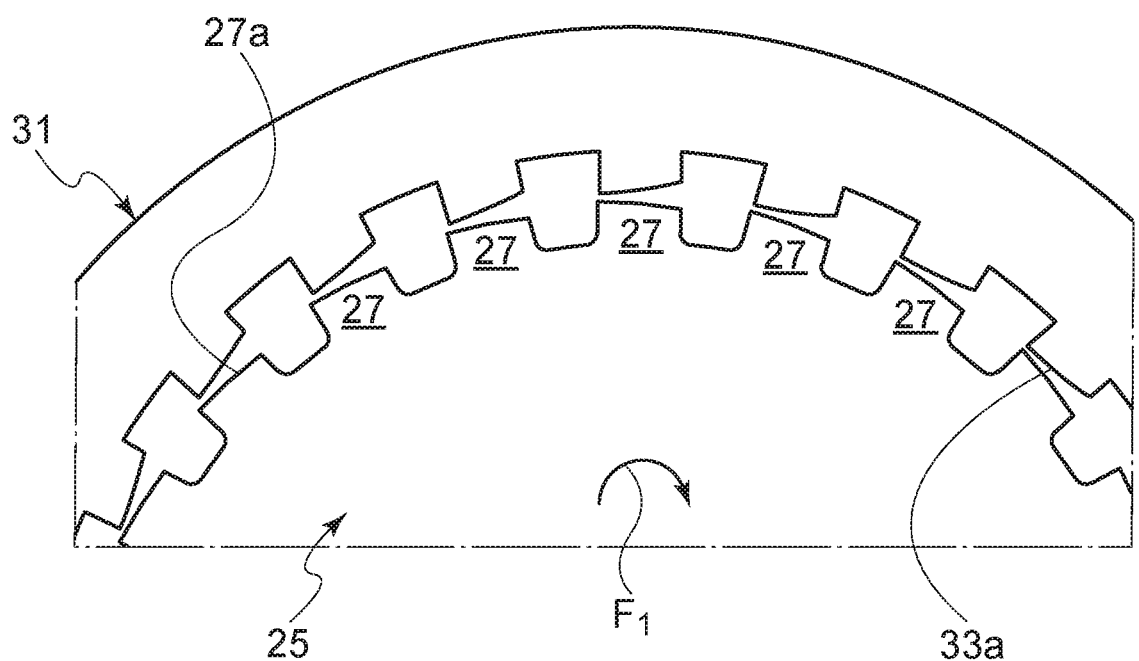
FIG. 3A is a schematic view of the rotor and stator teeth of a high-shear-stress and high-cavitation stage of the apparatus shown in FIG. 1.

Referring to FIGS. 1 to 3, the apparatus according to the invention has been generally denoted by reference numeral 11. Apparatus 11 illustrated is made in accordance with a preferred embodiment of the invention and it mainly comprises a plurality of serially arranged stages for enhancing phase contact and chemical reactions. More particularly, apparatus 11 comprises high-turbulence mixing stages 13 alternated with high-shear-stress and high-cavitation stages 15. As it will become more apparent from the following description, stages 13, 15 of apparatus 11 are adapted to subject a multiphase flow passing through said stages 13, 15 to an increase of the relative sliding speeds of the phases involved.

In the embodiment illustrated, three high-turbulence mixing stages 13 are provided in the whole and two high-shear-stress and high-cavitation stages are provided in the whole. Other embodiments are possible, comprising at least one high-turbulence mixing stage 13 and at least one high-shear-stress and high-cavitation stage 15.

Always with reference to the preferred embodiment illustrated, stages 13 comprise a rotor 17 rotatable within a mixing chamber 19 surrounded by a stator 21. Moreover, according to the invention, rotor 17 comprises at least one radial pin 23 integral with said rotor 17 rotating within mixing chamber 19. Said pins 23 radially extend from the axis of rotation of shaft 39 of rotor 17, preferably over such a length that the diameter of the external circumference described by pin 23 is in the range of 0.3×D to 0.9×D, D being the diameter of mixing chamber 19. In the embodiment illustrated, four pins 23 are provided in each mixing stage 13, but embodiments with any number of pins can be envisaged. Moreover, pins 23 associated with a same mixing stage 13 may be arranged on a same plane perpendicular to the axis of rotation of rotor 17 or on parallel planes, as in the embodiment illustrated. Moreover, in the embodiment illustrated, mixing stages 13 are substantially identical and have all the same number of pins 23. However, according to the invention, embodiments with mixing stages 13 different from one another can be envisaged, where moreover the number of pins 23 is different in different stages. In the embodiment illustrated, pins 23 have circular cross-section, substantially constant over the longitudinal pin axis, but pins with a cross-sectional shape different from the circular shape, e.g. an oval or another shape, or pins with variable cross-section along the longitudinal axis, can possibly be provided. Preferably, according to the invention, mixing stage 13 is adapted to subject the multiphase flow to a high-turbulence regimen with Reynolds number (Re)>500,000.

Stages 15 comprise a rotor 25 provided with radial teeth 27 and housed in a cavitation chamber 29 surrounded by a stator 31 provided with radial teeth 33. Preferably, the number of radial teeth 27 in rotor 25 and radial teeth 33 in stator 31 is the same. Moreover, according to the invention, facing surfaces 35, 37 of teeth 27, 33 of rotor 25 and stator 31, respectively, have a parabolic profile in circumferential direction.

Figure 3B:
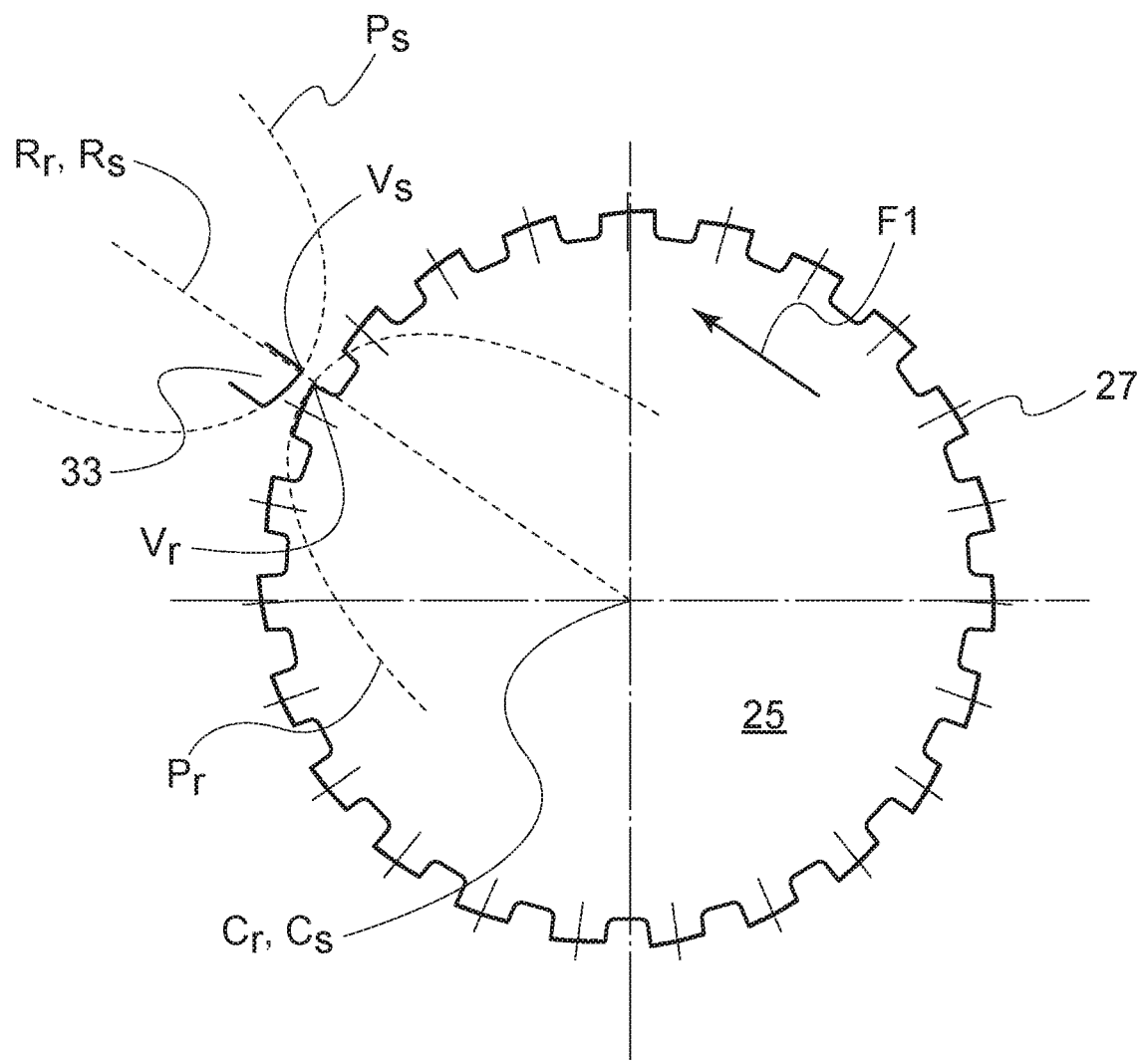
FIG. 3B is a schematic plan view of a rotor.
Figure 3C:
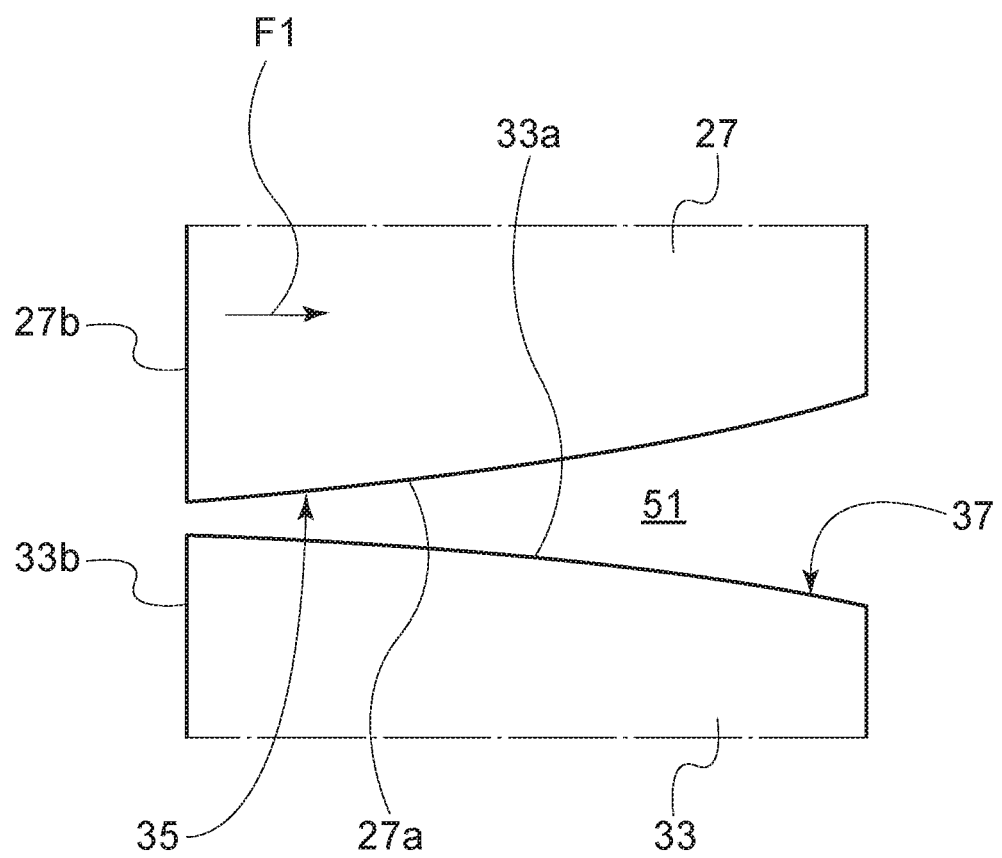
FIG. 3C is an enlarged view of the teeth shown in FIG. 3B.

As it can be better appreciated from FIGS. 3B and 3C, rotor teeth 27 have a parabolic profile 27a in circumferential direction. According to the invention, profile 27a of tooth 27 lies along the curve of a parabola Pr of which vertex Vr is located at rear edge 27b of tooth 27, with respect to the direction of rotation of rotor 25 (arrow F1), and along radius Rr connecting said edge 27b to centre Cr of rotor 25. The focus of parabola Pr also lies on said radius Rr.

Correspondingly, as it can be appreciated in particular from FIGS. 3B and 3C, stator teeth 33 have a parabolic profile 33a that preferably is identical to and is the mirror image of the profile of teeth 27. More precisely, according to the invention, profile 33a of tooth 33 lies along the curve of a parabola Ps of which vertex Vs is located at rear edge 33b of stator tooth 33, with respect to the direction of rotation of rotor 25, along radius Rs connecting said edge 33b to stator centre Cs, coinciding with centre Cr of rotor 25. The focus of parabola Ps also lies on said radius Rs.

In a preferred embodiment of the invention, the equation of the parabola of the profile of the rotor and/or stator teeth is $Y = 0.0062974\ X^2$.

Gap 51 between rotor teeth 27 and stator teeth 33 is minimum at edges 27b, 33b of teeth 27, 33, when said edges are substantially aligned along the corresponding rotor and stator radiuses Rr, Rs.

According to the invention, rotor 17 and rotor 25 are integral with a common rotating shaft 39. Preferably, shaft 39 is made to rotate by an electric motor 41 steadily associated with a supporting frame 43.

In the embodiment illustrated, mixing stages 13 have an inlet port 45a and an outlet port 45b both opening in a corresponding mixing chamber 19. Ports 45a and 45b are associated with ducts 47a, 47b for transporting the substance or mixture of substances into or out of chamber 19.

Moreover, mixing stages 13 can be provided with injection nozzles 49a, 49b adapted to inject a substance or a mixture of substances into mixing chamber 19. At least one injection nozzle 49a, 49b can be provided in each mixing stage 13, and moreover one or more mixing stages 13 can lack the nozzles. In the example illustrated, it is assumed that two consecutive stages 13 are provided with a corresponding nozzle 49a, 49b.

A non-limiting exemplary embodiment of apparatus 11 according to the invention has:
- diameter of toothed rotors 25 ranging from about 50 to 500 mm and preferably from about 100 to 300 mm;
- minimum gap between rotor teeth 27 and stator teeth 33 ranging from about 0.2 to 5.0 mm and preferably from about 0.5 to 2.5 mm;
- axial length of toothed rotors 25 ranging from about 0.05 to 2.5 times the diameter of rotor 25, and preferably ranging from about 0.1 to 1.0 times the diameter of rotor 25;
- internal diameter of mixing chambers 19 and cavitation chambers 29 ranging from about 50 to 500 mm, and preferably ranging from about 100 to 300 mm;
- axial length of high-turbulence mixing stages 13 ranging from about 0.1 to 2.5 times the internal diameter of the corresponding mixing chamber 19, and preferably ranging from about 0.25 to 1.5 times the internal diameter of chamber 19;
- rotation speed ranging from 500 to 5000 rpm, preferably from 1000 to 3000 rpm.

Figure 4A:
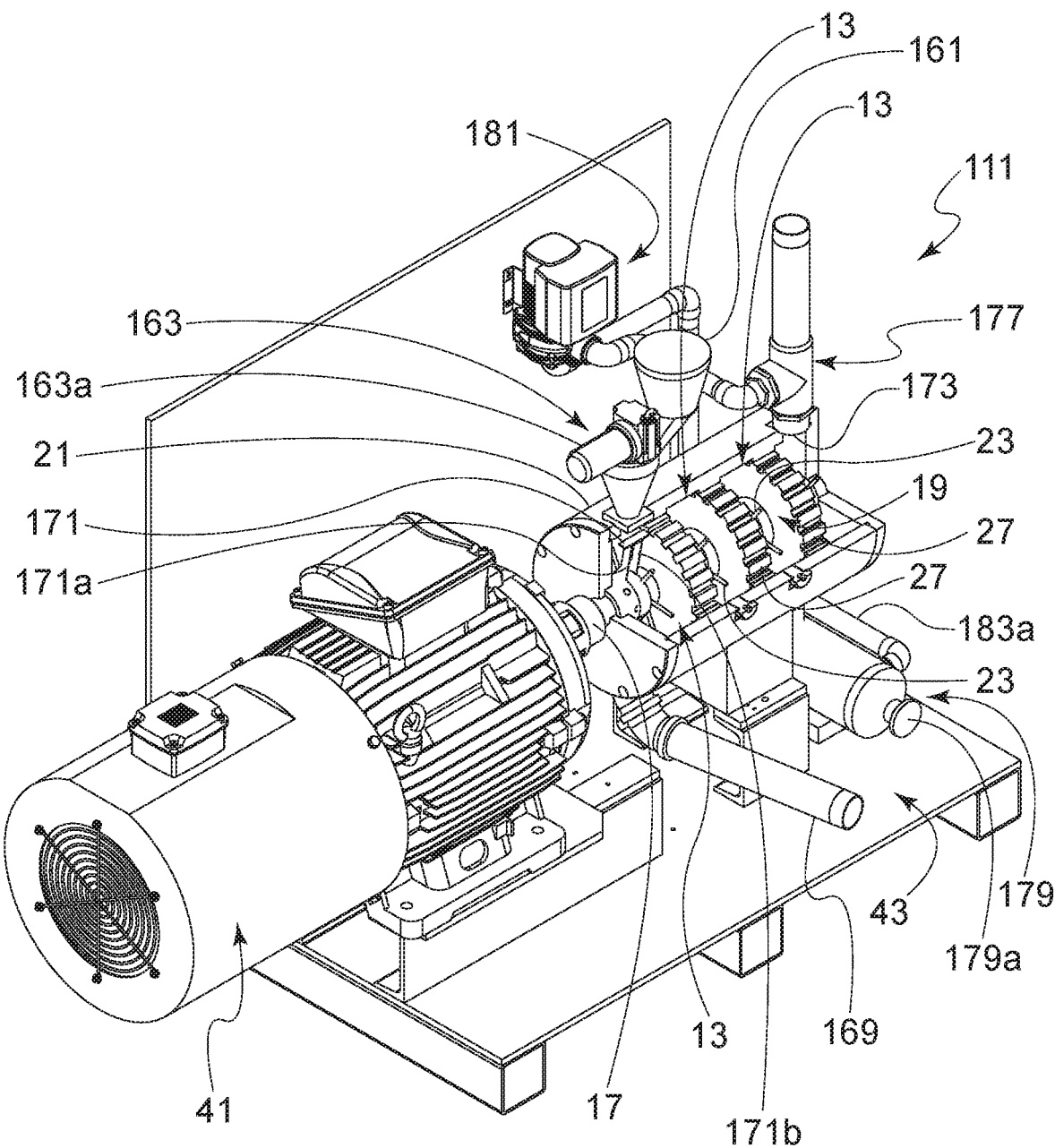
FIG. 4A is a part-sectional, rear perspective view of an apparatus according to the invention, with three high-shear-stress and high-cavitation stages.
Figure 4B:
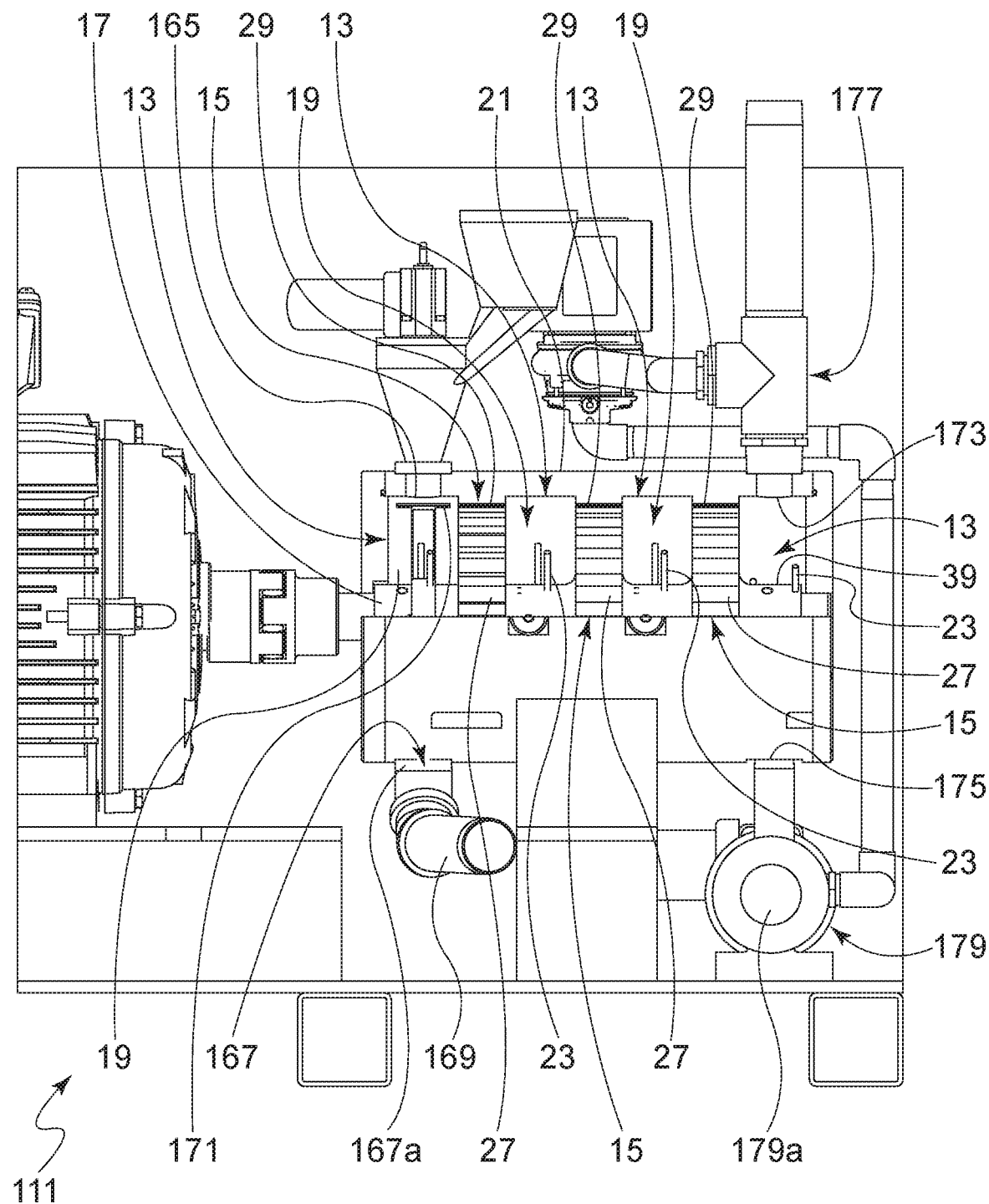
FIG. 4B is a part-sectional, front plan view of the apparatus shown in FIG. 4A.
Figure 4C:
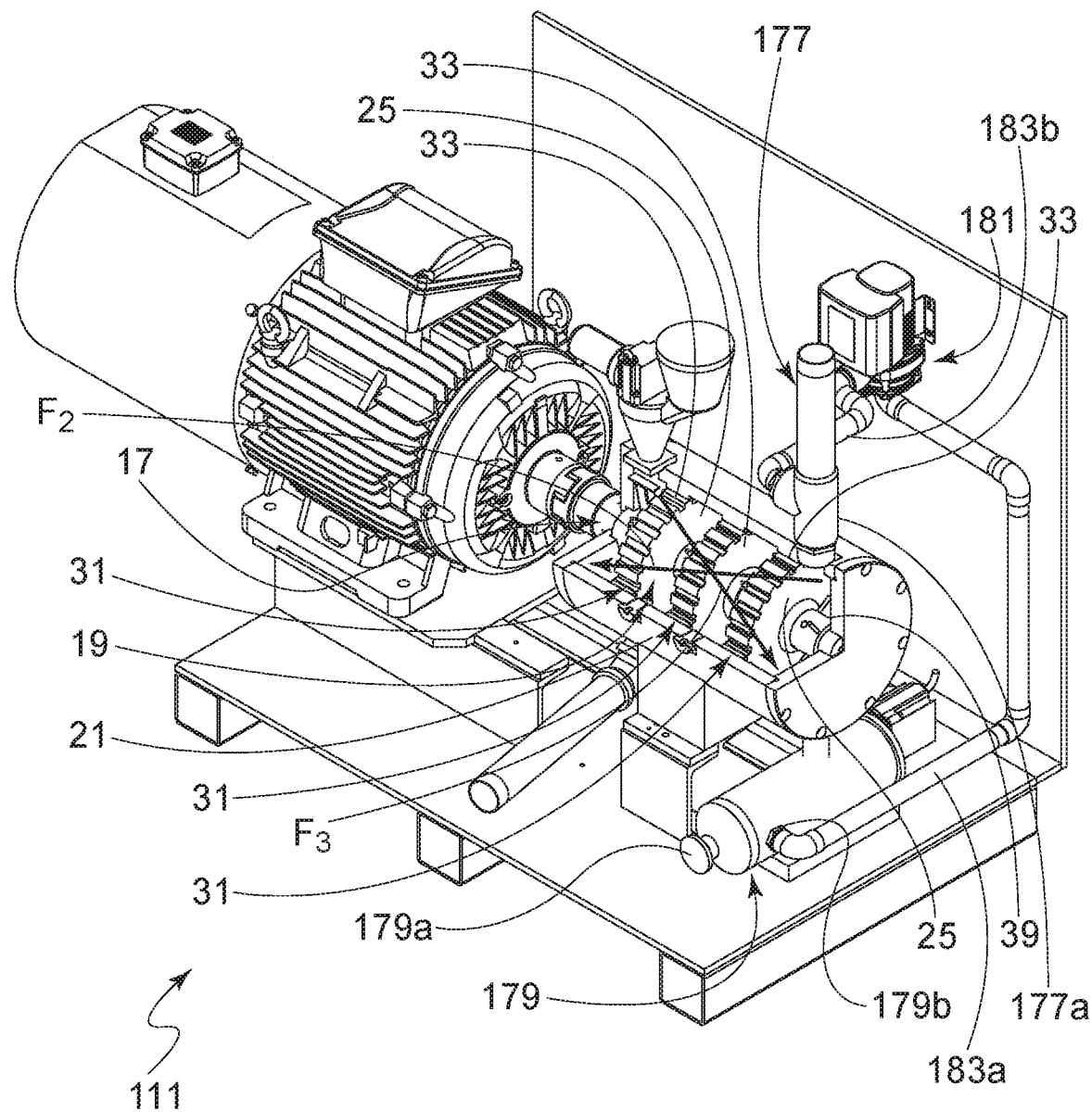
FIG. 4C is a part-sectional, front perspective view of the apparatus shown in FIG. 4A.
Figure 5:
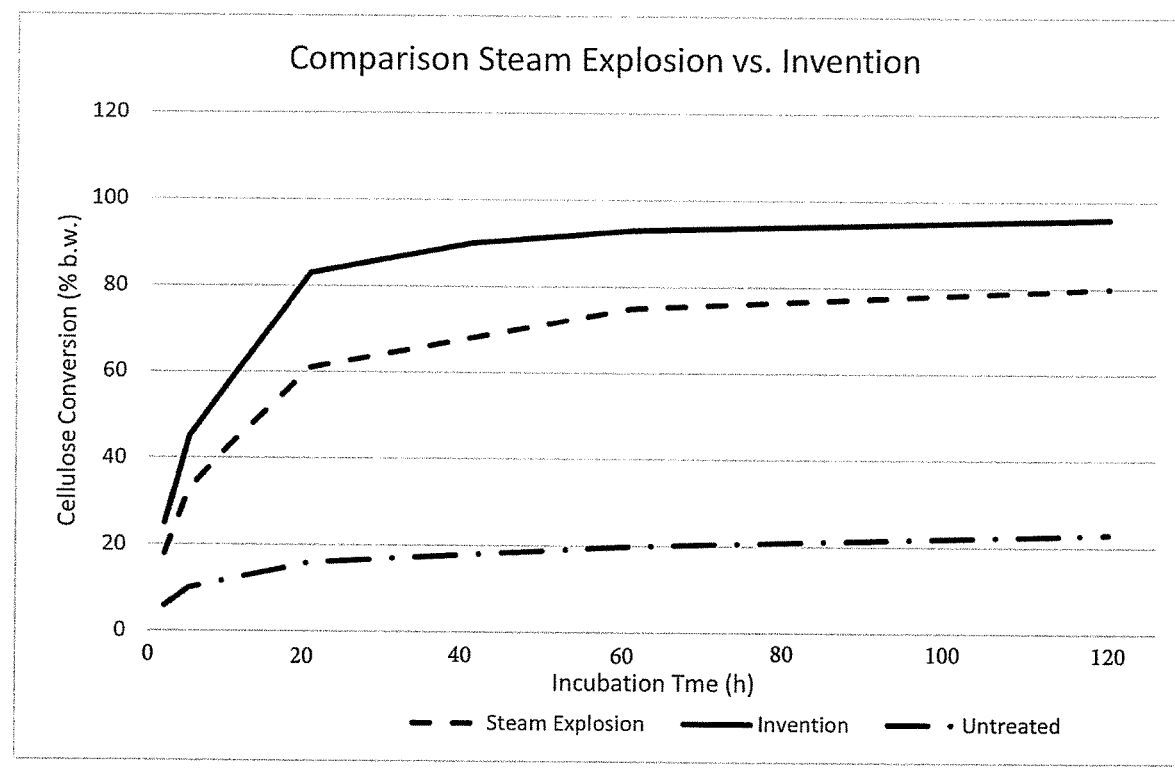
FIG. 5 is a graph of cellulose substrate conversion for steam explosion versus the invention as disclosed for Example 1.

Referring to FIGS. 4A, 4B and 4C, there is shown an apparatus 111 in accordance with a preferred embodiment of the invention, comprising four mixing stages 13 alternated with three high-shear-stress and high-cavitation stages 15. The embodiment illustrated of apparatus 111 is configured for countercurrent operation. Arrow F2 in FIG. 4C denotes the prevailing flow direction of the liquid phase in stages 13, 15, and arrow F3 denotes the prevailing flow direction of the solid phase.

Apparatus 111 is equipped with an inlet hopper 161 for the fresh solid matrix. The configuration illustrated includes, downstream of hopper 161, a motor-driven squeezing device 163 adapted to transfer the material of the solid matrix introduced into hopper 161 to the first mixing stage 13, proximal relative to motor 41. Squeezing device 163 can comprise for instance a conical screw or a conical auger driven by an electric motor 163a. Squeezing device 163 communicates with the proximal first mixing stage 13 through a port 165 provided in stator 21. Moreover, a second port 167 is provided in the proximal first mixing stage 13 for the outlet of the liquid phase from proximal mixing stage 13. Said second port 167 is preferably equipped with a grid 167a for preventing the solid phase from being evacuated, together with the liquid phase, from proximal mixing stage 13 through port 167. Port 167 communicates with a duct 169 for liquid phase evacuation, communicating, for instance, with a collecting tank located downstream of said duct 169.

In the preferred but not exclusive embodiment illustrated, inlet port 165 for solid phase inlet and outlet port 167 for liquid phase outlet are located diametrically opposite and in the upper and lower part of apparatus 111, respectively, when the latter is in working configuration.

Always with reference to the embodiment illustrated, proximal mixing stage 13 further includes a rotatable blade 171, fixedly connected to rotor 17 by means of a pair of parallel arms 171a, 171b radially extending from rotor 17. The purpose of blade 171 is to prevent grid 167a separating stage 13 from evacuation duct 169 from becoming clogged due to the accumulation of solid material, which would prevent liquid phase evacuation through duct 169. Blade 171 keeps said grid 167a free mainly thanks to the circumferential vortex motion imparted to the mixed liquid-solid substance present in proximal stage 13.

According to the invention, in the embodiment illustrated, in which apparatus 111 is configured for countercurrent operation, the amount of liquid phase substance evacuated from proximal mixing stage 13 is prevailing with respect to the amount of solid phase substance evacuated through the grid separating the evacuation duct from the same proximal mixing stage 13.

In the configuration illustrated, mixing stage 13 distal relative to electric motor 41 is provided with a first port 173 for liquid phase inlet and a second port 175 for solid phase evacuation. In the embodiment illustrated, ports 173 and 175 are located diametrically opposite and in the upper and lower part of apparatus 111, respectively, when the latter is in working configuration.

A duct 177 for feeding the liquid phase, e.g. water, is provided upstream of port 173. For instance, duct 177 may be connected, upstream of port 173, to a circuit delivering the liquid substance coming from a suitable tank. Always with reference to the preferred, but not exclusive, embodiment illustrated, a screw press 179, adapted to separate the solid and liquid phases contained in the substance evacuated from distal mixing stage 13, is provided downstream of port 175. Screw press 179 has a first port 179a for the evacuation of the exhausted solid phase or solid matrix and a second port 179b for liquid phase outlet. According to the invention, in the embodiment illustrated, in which apparatus 111 is configured for countercurrent operation, the amount of solid phase substance evacuated from distal mixing stage 13 is prevailing with respect to the amount of liquid phase substance evacuated from the same distal mixing stage 13.

Preferably, apparatus 111 is equipped with a recirculation pump 181 for recovering the residual liquid phase evacuated from screw press 179 through port 179b. Said pump 181 is connected, at its upstream side, to screw press 179 through a first duct 183a for transporting the liquid phase from screw press 179 to pump 181, and, at its downstream side, by means of a pipe tee 177a, to feeding duct 177 through a second duct 183b for transporting the liquid phase towards distal mixing stage 13.

Hereinafter. some examples of application of apparatus 11 made in accordance with the invention will be given.

Example 1

The apparatus according to the invention has been used for pre-treating straw in a method of obtaining sugars at low cost from residual biomass.

In the last decade, there has been a considerable interest in processes for converting lignocellulosic biomasses in biofuels and refinery intermediates, with the aim of identifying a practicable alternative for replacing fossil fuels. The concept of second generation biofuels and second generation biorefinery provides for starting from a raw matter belonging to the field of residual biomasses, and for obtaining a current of sugars ($C_5$ and $C_6$, i.e. with 5 or 6 carbon atoms) therefrom. Yet, the structural complexity of the cell walls of plants makes the same biomass highly refractory to chemical or biological attack. Different pre-treatment processes (with different chemical approaches, at different temperature and pressure levels) exist for reducing plant refractoriness to chemical or biological attack. Among such processes, pre-treatments in diluted acidic solution are at present recognised as the most effective processes to make biomass accessible to enzymatic attack with cellulase-type enzymes. In this context, for a given strictness of the operating conditions, the kind of reactor or apparatus in which pre-treatment is carried out has a considerable effect on the properties of the pre-treated material and consequently on the performance of the subsequent enzymatic hydrolysis. This is due to the peculiarities of the reactor or apparatus in terms of capacity of interphase area generation and of increase in the overall size and global volume of the pores, and hence in terms of capacity of devastation of the cell walls in the biomass.

"Steam explosion" is a known hydrothermal treatment making separation of the three fractions forming the common vegetable substrates (hemicellulose, cellulose and lignin) easier and less severe from the environmental standpoint. The method consists in using high-pressure saturated steam for quickly heating the biomass in a continuous or discontinuous reactor. The material is kept at the desired temperature (180-230° C.) for a short period (1-10 minutes), during which hemicellulose is hydrolysed and made soluble. At the end of this time period, pressure is quickly brought back to atmospheric pressure, thereby obtaining an explosive decompression further fraying the biomass.

The results attainable with the apparatus according to the invention and with an apparatus for "steam explosion" have been compared in case of a pre-treatment in diluted acidic solution of wheat straw having the following characteristics (% by weight):

| | |
|---|---|
| Humidity content | 10% |
| Cellulose | 38.2% |
| Hemicellulose | 24.1% |
| Lignin | 7.3% |
| Proteins | 3.4% |
| Ashes | 7% |

The following operating conditions have been adopted for the prior art apparatus: L/S ratio=10; temperature=150° C.; time=6 min; acid concentration=2% by weight $H_2SO_4$, L/S being the ratio of the liquid phase flow rate to the solid phase flow rate.

The same operating conditions have been adopted for the apparatus according to the invention, except that the temperature was 30° C. The apparatus employed further had the following features:

No. of turbulent mixing chambers: 2;
No. of rotor-stator stages: 2 (rotor and stator elements having teeth with parabolic profile);
Internal diameter of the stators: 195 mm;
Rotor-stator gap: 1 mm ($1^{st}$ stage) and 0.75 mm ($2^{nd}$ stage);
Rotation speed: 2100 rpm.

Thereafter, the specimens of pre-treated biomass have been submitted to an enzymatic digestion method by using a cellulase-type enzymatic complex (in a concentration of 18 mg of enzyme GC 220 produced by Genenco/Danisco per gram of glucancellulose, at pH=5 and in a container stirred at 120 rps), and a diagram of the cellulose substrate conversion versus time has been plotted.

| Incubation time [h] | Cellulose conversion [% b.w.] | | |
|---|---|---|---|
| | Steam Explosion | Invention | Untreated material |
| 2 | 18 | 25 | 6 |
| 5 | 33 | 45 | 10 |
| 10 | 43 | 58 | 12 |
| 20 | 61 | 83 | 16 |
| 40 | 68 | 90 | 18 |
| 60 | 75 | 93 | 20 |
| 120 | 80 | 96 | 23 |

Example 2

In this second example of application, the apparatus according to the invention has been used for a treatment of bacterial inactivation on highly-contaminated raw milk. The apparatus employed had the following features (the numbering of the mixing chambers is referred to the direction of advance of the phase to be processed):

No. of turbulent mixing chambers: 2;
No. of rotor-stator stages: 2 (rotor and stator elements having teeth with parabolic profile);
Diameter of the mixing chambers: 206 mm (D);
Axial length of the mixing chambers: 70 mm (i.e. 0.29× D);
Pins of the first mixing chamber: 4 pins arranged on parallel planes so as to form a spiral with forward thrust when the shaft rotates. Pins with radial size 59.75 mm, i.e. such a size that the circumference described by the pins during rotation is 0.58×D;
Pins of the second mixing chamber: 6 pins arranged on parallel planes so as to form a spiral with forward thrust when the shaft rotates. Pins with radial size 59.75 mm, i.e. such a size that the circumference described by the pins during rotation is 0.58×D;
Internal diameter of the stators: 195 mm;
Rotor-stator gap (i.e. minimum rotor-stator span): 1 mm ($1^{st}$ stage) and 0.75 mm ($2^{nd}$ stage);
Axial length of rotors and stators: 40 mm;
Rotation speed: 1500 rpm;
Motor drive: three-phase electric motor with installed power 15 kW.

The specimen of raw cow milk with high bacterial contamination had the following characteristics:

| | |
|---|---|
| Fats | 6.6% v/v |
| Proteins | 4.0% w/w |
| Lactose | 3.7% w/w |
| Total solids | 17.25% w/w |
| pH | 6.36 |
| Ashes | 0.83% w/w | and had the following microbiological content:

| | |
|---|---|
| Total count of mesophile aerobic bacteria (TC) | 6.35 log cfu/ml |
| Bacterial Endospores (BE) | 2.62 log cfu/ml |
| Lactobacilli (LAB) | 5.04 log cfu/ml |
| Coliforms (CF) | 3.36 log cfu/ml |
| Escherichia Coli (EC) | 1.89 log cfu/ml |
| Staphylococcus Aureus (SA) | 2.34 log cfu/ml |

The set-up or starting step of the method, upstream of the apparatus, included a tank for the liquid phase to be processed (in the specific case, contaminated milk, with the above characteristics), a centrifugal pump for feeding the milk to the apparatus, on the delivery line of which a flow rate adjustment valve was connected, and a flow rate meter or float flowmeter (of the Asametro® kind). An outlet line for the processed milk has been provided downstream of the apparatus, which line was equipped with a sampling valve followed by a three-way valve for directing the processed milk either to the milk collecting tank or to a recirculation line (in case of treatments entailing several passes through the apparatus). A plate exchanger (fed with refrigerated water in countercurrent mode, as far as the coolant fluid is concerned: inlet temperature 2° C. and outlet temperature 7°

C.) was located on the recirculation line and was adapted to bring back the milk, at the end of each pass to the temperature of 10° C. set for the point of feed to the apparatus.

Three kinds of treatment have been performed:
(a) Single pass through the apparatus (permanence time inside the apparatus: 15 s; treatment start temperature: 10° C.; treatment end temperature: 15° C.);
(b) Five passes through the apparatus with inter-refrigeration between successive passes (permanence time inside the apparatus: 15 s/pass, 75 s in total; treatment start temperature: 10° C.; treatment end temperature: 15° C.);
(c) Single pass through the apparatus with $CO_2$ injection into the first mixing chamber (permanence time inside the apparatus: 15 s; treatment start temperature: 10° C.; treatment end temperature: 15° C.; $CO_2$ dosage: 20 g/l).

In all treatments described, the flow rate of the liquid phase (i.e. contaminated milk) fed to the apparatus was 15 l/min.

The bacterial content at the end of the treatment was measured (values expressed in log cfu/ml):

|  | initial | After (a) | After (b) | After (c) |
|---|---|---|---|---|
| Total count of mesophile aerobic bacteria (TC) | 6.35 | 3.12 | 1.91 | 2.21 |
| Bacterial Endospores (BE) | 2.62 | 1.95 | 0.79 | 1.17 |
| *Lactobacilli* (LAB) | 5.04 | 2.47 | 1.02 | 1.56 |
| Coliforms (CF) | 3.36 | 1.23 | 0.51 | 0.65 |
| *Escherichia Coli* (EC) | 1.89 | 0.32 | ≈0 | 0.25 |
| *Staphylococcus Aureus* (SA) | 2.34 | 2.32 | 1.44 | 0.66 |

The effectiveness of the apparatus (with and without the aid of $CO_2$ injection) in bacterial inactivation treatments has thus been confirmed.

Example 3

In this example the apparatus according to the invention has been employed as extractor.

The apparatus employed had the following features:
No. of turbulent mixing chambers: 3;
No. of rotor-stator stages: 2 (rotor and stator elements having teeth with parabolic profile);
Turbulent mixing chambers alternated with high-shear-stress and high-cavitation stages;
Internal diameter of the stators: 195 mm;
Rotor-stator gap 1 mm ($1^{st}$ stage) and 0.75 mm ($2^{nd}$ stage);
Rotation speed: 2000 rpm.

An extraction of carotenes (mainly lycopene) from tomato skins by means of extra virgin olive oil has been performed.

The extra virgin olive oil (EVOO) employed had the following characteristics:

| Density (20° C.) | 910 kg/m³ |
|---|---|
| Viscosity (20° C.) | 82 cP |
| Monounsaturated fat content | 71.7% w/w |
| Polyunsaturated fat content | 15.5% w/w |
| Free acidity | 0.221% |
| Peroxide index | 3.905 meq $O_2$/kg |
| Total carotenes | 3 mg/kg (of which 0 mg/kg of Lycopene) |

The tomato skins being treated had the following characteristics:

| Morphology | flakes |
|---|---|
| Size | 1-3 mm |
| Humidity | 10% w/w |
| Lycopene content | 1140 mg/kg |

Two kinds of treatment have been performed:
(a) Single pass through the apparatus (permanence time inside the apparatus: 5 s; treatment start temperature: 25° C.; treatment end temperature: 28° C.) with equicurrent feed of tomato skins and EVOO in a ratio 1:5 w/w;
(b) Single pass through the apparatus (permanence time inside the apparatus: 5 s; treatment start temperature: 25° C.; treatment end temperature: 28° C.) with countercurrent feed of tomato skins and EVOO in a ratio 1:5 w/w.

The content of total carotenes and lycopene has been measured on the enriched EVOO obtained at the end of the extraction treatment/values expressed in log mg/Kg):

|  | initial | After (a) | After (b) |
|---|---|---|---|
| Total carotenes | 3 | 94 | 173 |
| Lycopene | 0 | 73 | 148 |

The effectiveness of the apparatus according to the invention as extractor, and above all the possibility of obtaining multistage extractor performance if the solid phase and the extracting liquid phase are fed in countercurrent mode, have been proved.

Example 4

In this example the apparatus according to the invention has been employed as extractor.

The apparatus employed had the following features:
No. of turbulent mixing chambers: 4;
No. of rotor-stator stages: 3 (rotor and stator elements having teeth with parabolic profile);
Turbulent mixing chambers alternated with high-shear-stress and high-cavitation stages;
Diameter of the mixing chambers: 206 mm;
Axial length of the mixing chambers: 70 mm;
Pins of the $1^{st}$ mixing chamber: 6 pins arranged on parallel planes so as to form a spiral with forward thrust when the shaft rotates. Pins with radial size 75 mm, i.e. such a size that the circumference described by the pins during rotation is 0.73×D, D being the diameter of the mixing chambers;
Pins of the $2^{nd}$ mixing chamber: 6 pins arranged on parallel planes so as to form a spiral with forward thrust when the shaft rotates. Pins with radial size 75 mm, i.e. such a size that the circumference described by the pins during rotation is 0.73×D;
Pins of the $3^{rd}$ mixing chamber: 6 pins arranged on parallel planes so as to form a spiral with forward thrust when the shaft rotates. Pins with radial size 75 mm, i.e. such a size that the circumference described by the pins during rotation is 0.73×D;
Pins of the $4^{th}$ mixing chamber: 4 pins arranged on parallel planes so as to form a spiral with forward thrust when the shaft rotates. Pins with radial size 59.75 mm, i.e. such a size that the circumference described by the pins during rotation is 0.58×D;
Internal diameter of the stators: 195 mm;
Minimum rotor-stator gap: 2.5 mm ($1^{st}$ stage), 1.25 mm ($2^{nd}$ stage) and 0.75 mm ($3^{rd}$ stage);

Axial length of rotors and stators: 35 mm;
Rotation speed: 2250 rpm;
Motor drive: three-phase electric motor with installed power 22 kW.

The apparatus has been operated in equicurrent mode and countercurrent modes:

Equicurrent mode: by feeding the solid phase into the 1$^{st}$ mixing chamber by means of an auger feeder, and by feeding also the liquid phase into the 1$^{st}$ mixing chamber by means of a peristaltic positive-displacement pump with flow rate constant in time; by extracting the final suspension from the last mixing chamber (i.e. the 4$^{th}$ mixing chamber) and then subjecting it to liquid-solid separation by means of decantation, followed by a final pressing. Subsequently, centrifugation on a disc centrifuge and filtration on a polyester bag filter with absolute retention degree 50 microns have been performed on the liquid phase, and then a dehydration of the liquid phase extracted has been carried out by means of a vacuum evaporator of the "rotovapor" kind, followed by a vacuum cabinet drier, whereby a dry extract in powder form has been obtained.

Countercurrent mode: by feeding the solid phase into the 1$^{st}$ mixing chamber by means of an auger feeder, and by feeding the extracting liquid phase into the 4$^{th}$ mixing chamber by means of a peristaltic positive-displacement pump with flow rate constant in time; by extracting the exhausted solid phase from the 4$^{th}$ mixing chamber by means of an auger extractor-squeezer with recirculation of the liquid phase squeezed in the 4$^{th}$ mixing chamber, and by extracting the liquid phase extracted from the 1$^{st}$ mixing chamber through a tube surmounted by a mesh grid, with mesh span having a 0.5×0.5 mm size, adapted to let the liquid phase go out and to retain the solid phase, wherein said grid was kept clean by means of a turbulent flow of a liquid phase current moved by a blade fit onto the machine shaft, the circumference described by the blade having diameter 0.9×D. The liquid phase extracted was centrifuged on a disc centrifuge, filtered on a polyester bag filter with absolute retention degree 50 microns and then subjected to dehydration by means of a vacuum evaporator of the "rotovapor" kind, followed by a vacuum cabinet drier, whereby a dry extract in powder form has been obtained.

Extraction of polyphenols (mainly oleuropein) from olive tree leaves (solid phase) has been performed, by using water as extracting liquid phase.

Water fed to the TURBEX extractor had the following characteristics:

| | |
|---|---|
| pH | 7.7 |
| Fixed residue at 180° C. | 143 mg/l |
| Hardness | 21° F. |
| Conductivity | 362 microsiemens/cm at 20° C. |
| Temperature | 25° C. |

Olive tree leaves fed as the solid phase had the following characteristics:

| Morphology | flakes |
|---|---|
| Size | 1-2 mm |
| Humidity | 10% w/w |

-continued

| Morphology | flakes |
|---|---|
| Oleuropein content | 76 g/kg |
| Content of water-extractable substances other than oleuropein | 512 g/kg |
| Temperature | 5° C. |

The operating conditions of the two kinds of treatment are as follows:

Equicurrent mode: Single pass through the apparatus (permanence time inside the apparatus: 36 s; treatment start temperature: 25° C.; treatment end temperature: 30° C.), with equicurrent feed of olive tree leaves and water in a ratio 1:7 w/w [Liquid phase (water) flow rate 700 kg/h—Solid phase (olive tree leaves) flow rate 100 kg/h].

Countercurrent mode: Single pass through the apparatus (permanence time inside the apparatus: 36 s; treatment start temperature: 25° C.; treatment end temperature: 30° C.), with countercurrent feed of olive tree leaves and water in a ratio 1:7 w/w [Liquid phase (water) flow rate 700 kg/h—Solid phase (olive tree leaves) flow rate 100 kg/h].

The solid extract obtained has been weighted, the oleuropein content in the solid extract has been analysed by means of HPLC (High Performance Liquid Chromatography) technique and the oleuropein extraction yield has been calculated.

Result of the Equicurrent Treatment:
Amount of total solid extract obtained: 305 g/kg
of which
Oleuropein content: 16.7% w/w (corresponding to 50.9 g)
Content of other extractable substances: 83.3% w/w (corresponding to 254.1 g)
Oleuropein extraction yield: 50.9/76=67% w/w
Extraction yield of other extractable substances: 254.1/512=49.6% w/w
Result of the countercurrent treatment:
Amount of total solid extract obtained: 375 g/kg
of which
Oleuropein content: 20.05% w/w (corresponding to 75.2 g)
Content of other extractable substances: 79.95% w/w (corresponding to 299.8 g)
Oleuropein extraction yield: 75.2/76=98.9% w/w
Extraction yield of other extractable substances: 299.8/512=58.6% w/w The results obtained with the apparatus disclosed in this fourth exemplary embodiment of the invention prove the effectiveness of the apparatus as extractor, and above all the possibility of obtaining multistage extractor performance if the solid phase and the extracting liquid phase are fed in countercurrent mode.

INDUSTRIAL APPLICABILITY

The apparatus according to the invention finds advantageous applications in several industrial fields, e.g., as extractor, mixer, homogeniser, reactor, biomass pre-treating apparatus for biorefineries and biofuel installations, etc.

The apparatus can be used for instance as stripper and reactor in the field of the treatment of primary and secondary waters in order to obtain $NH_3$ removal and to enhance the performance of advanced oxidation techniques for COD removal. Moreover, the apparatus according to the invention can be used as reactor for oxidising paraxylene to terephthalic acid and as reactor for polymerising polyester, enabling attaining the reaction activation energy mainly or exclusively by means of the kinetic component, and consequently conducting the reactions at lower temperatures than in the conventional practice, besides of course attaining a drastic reduction of the reaction times thanks to the enhancement of the generation of the interphase area and the property transport coefficients, with a consequent saving in investment and operating costs.

The invention as described and shown can undergo several alternatives and modifications lying in the same inventive principle.

The invention claimed is:

1. An apparatus (11) for enhancing phase contact and chemical reactions, comprising:
   at least one first high-turbulence mixing stage (13);
   at least one second high-shear-stress and high-cavitation stage (15);
   said stages (13, 15) being adapted to cause an increase in relative sliding speeds of phases involved in a multiphase flow passing through said stages (13, 15),
   wherein said at least one first high-turbulence mixing stage (13) comprises a rotor (17) rotatable within a mixing chamber (19) surrounded by a stator (21), and wherein the rotor (17) comprises at least one radial pin (23) integral with said rotor (17),
   wherein said at least one radial pin (23) radially extends from an axis of rotation of a shaft (39) of the rotor (17) over such a length that a diameter of an external circumference described by the at least one radial pin (23) is in a range of 0.3 to 0.9×D, D being a diameter of the mixing chamber (19),
   wherein said at least one first high-turbulence mixing stage (13) is adapted to subject the multiphase flow to a high-turbulence regimen with Reynolds number Re>500,000 and said at least one second high-shear-stress and high-cavitation stage (15) is adapted to subject the multiphase flow to a cavitation regimen characterized by a cavitation number $\sigma<1$, where $\sigma=2(pr-pv)/((p)(v^2))$, pr is reference pressure in pascal, pv is fluid vapor pressure in pascal, p is fluid density in $kg/m^3$, and v is speed of the flow of the fluid in m/sec,
   wherein said at least one second high-shear-stress and high-cavitation stage (15) comprises a rotor (25) provided with radial teeth (27) and housed in a cavitation chamber (29) surrounded by a stator (31) provided with radial teeth (33),
   wherein facing surfaces (35, 37) of the radial teeth (27) of the rotor (25) and the radial teeth (33) of the stator (31) have a parabolic profile in circumferential direction,
   wherein the parabolic profile of each tooth of said radial teeth (27) of the rotor (25) lies along a curve of a parabola (Pr) of which a vertex (Vr) is arranged at a rear edge (27b) of the tooth (27), with respect to a direction of rotation (F1) of the rotor (25), and along a radius (Rr) connecting said rear edge (27b) to a centre (Cr) of the rotor (25), a focus of the parabola (Pr) being also located on said radius (Rr), and
   wherein the parabolic profile of each tooth of said radial teeth (33) of the stator (31) lies along a curve of a parabola (Ps) of which a vertex (Vs) is arranged at a rear edge (33b) of the tooth (33), with respect to the direction of rotation (F1) of the rotor (25), and along a radius (Rs) connecting said rear edge (33b) to the centre (Cs) of the stator (31), a focus of the parabola (Ps) being also located on said radius (Rs).

2. The apparatus according to claim 1, comprising a plurality of said first high-turbulence mixing stages (13) and a plurality of said second high-shear-stress and high-cavitation stages (15), said stages (13, 15) being arranged in series and alternated with each other, so that the multiphase flow passes through each of said stages (13, 15), wherein the at least one radial pin (23) of each first high-turbulence mixing stage (13) and the rotor (25) of each second high-shear-stress and high-cavitation stage (15) are integral with the shaft (39).

3. The apparatus according to claim 1, wherein at least two said pins (23) are associated with a same high-turbulence mixing stage (13) and are arranged on a same plane perpendicular to the axis of rotation of the shaft (39) or on parallel planes perpendicular to the axis of rotation of the shaft (39).

4. The apparatus according to claim 1, wherein the at least one first high-turbulence mixing stage (13) comprises injection nozzles (49a, 49b) adapted to inject a flow of a substance or a mixture of substances into the mixing chamber (19).

5. The apparatus according to claim 1, wherein the parabolic profile of the radial teeth (33) of the stator (31) is identical to and a mirror image of the parabolic profile of the radial teeth (27) of the rotor (25).

6. The apparatus according to claim 1, wherein the equation of the parabola of the parabolic profile of the radial teeth (27) of the rotor (25) or of the radial teeth (33) of the stator (31) is $Y=0.0062974 X^2$.

7. The apparatus according to claim 1, wherein a gap (51) is provided between the radial teeth (27) of the rotor (25) and the radial teeth (33) of the stator (31), which gap is minimum at the rear edges (27b, 33b) of the radial teeth (27) of the rotor (25) and the radial teeth (33) of the stator (31) when said rear edges are substantially aligned along corresponding radiuses (Rr, Rs) of the rotor (25) and the stator (31).

8. The apparatus according to claim 1, wherein the rotor (25) of the at least one second high-shear-stress and high-cavitation stage (15) has a diameter ranging from 50 to 500 mm and an axial length ranging from about 0.05 to 2.5 times the diameter of the rotor (25), and wherein a minimum gap between the radial teeth (27) of the rotor (25) and the radial teeth (33) of the stator (31) ranges from about 0.2 to 5.0 mm.

9. The apparatus according to claim 8, wherein the diameter of the rotor (25) of the at least one second high-shear-stress and high-cavitation stage (15) is 100 to 300 mm.

10. The apparatus according to claim 8, wherein the axial length of the rotor (25) of the at least one second high-shear-stress and high-cavitation stage (15) is 0.1 to 1.0 times the diameter of the rotor (25).

11. The apparatus according to claim 8, wherein the minimum gap between the radial teeth (27) of the rotor (25) and the radial teeth (33) of the stator (31) ranges from 0.5 to 2.5 mm.

12. The apparatus according to claim 1, wherein the diameter (D) of the mixing chamber (19) and a diameter of the cavitation chamber (29) range from about 50 to 500 mm, and wherein an axial length of the at least one first high-turbulence mixing stage (13) ranges from about 0.1 to 2.5 times the diameter (D) of the mixing chamber (19).

13. The apparatus according to claim 12, wherein the diameter (D) of the mixing chamber (19) and the diameter of the cavitation chamber (29) range from 100 to 300 mm.

14. The apparatus according to claim 12, wherein the axial length of the at least one first high-turbulence mixing stage (13) ranges from 0.25 to 1.5 times the diameter (D) of the mixing chamber (19).

15. The apparatus according to claim 1, wherein a rotation speed of the rotor (17) of the at least one first high-turbulence mixing stage (13) ranges from 1000 to 3000 rpm.

16. The apparatus according to claim 1 operating in countercurrent mode, wherein the at least one first high-turbulence mixing stage (13) comprises:
a first high-turbulence mixing stage having a first port (165) for inlet of a first substance which is in a first physical state and a second port (167) for outlet of a second substance which is in a second physical state, and
a second high-turbulence mixing stage having a first port (173) for inlet of a substance which is in said second physical state and a second port (175) for outlet of a substance which is in said first physical state.

17. The apparatus according to claim 1 operating in equicurrent mode, wherein the at least one first high-turbulence mixing stage (13) comprises:
a first high-turbulence mixing stage having a first port (165) for inlet of a first substance which is in a first physical state and a second port (167) for inlet of a second substance which is in a second physical state, and a second high-turbulence mixing stage having a first port (173) for outlet of a substance which is in said second physical state and a second port (175) for outlet of a substance which is in said first physical state.

18. A method for enhancing phase contact and chemical reactions, comprising the steps of:
providing the apparatus according to claim 1; and
subjecting in the apparatus a multiphase flow to the at least one first high-turbulence mixing stage (13) and to the at least one second high-shear-stress and high-cavitation stage (15), said stages (13, 15) being adapted to cause an increase in relative sliding speeds of phases involved in the multiphase flow passing through said stages (13, 15).

19. The method according to claim 18, wherein said multiphase flow is obtained by feeding substances of different phases in countercurrent mode through said stages (13, 15).

* * * * *